(12) United States Patent
McLachlan et al.

(10) Patent No.: US 12,067,671 B2
(45) Date of Patent: Aug. 20, 2024

(54) OCCLUSION OF VIRTUAL CONTENT IN EXTENDED REALITY

(71) Applicant: Telefonaktiebolaget LM Ericsson (PUBL), Stockholm (SE)

(72) Inventors: Paul McLachlan, San Francisco, CA (US); Héctor Caltenco, Oxie (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/778,925

(22) PCT Filed: Nov. 26, 2019

(86) PCT No.: PCT/IB2019/060196
§ 371 (c)(1),
(2) Date: May 23, 2022

(87) PCT Pub. No.: WO2021/105751
PCT Pub. Date: Jun. 3, 2021

(65) Prior Publication Data
US 2023/0351675 A1    Nov. 2, 2023

(51) Int. Cl.
*G06T 15/20* (2011.01)
*G06Q 30/0241* (2023.01)
*G06T 19/00* (2011.01)

(52) U.S. Cl.
CPC ......... *G06T 15/20* (2013.01); *G06Q 30/0276* (2013.01); *G06T 19/006* (2013.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 8,527,341 B2    9/2013   Feuerstein et al.
9,466,074 B2    10/2016  van Datta et al.
(Continued)

OTHER PUBLICATIONS

Rashi Verma, Deliver more interactive ad experiences with Display & Video 360, Google Marketing Platform—Jun. 18, 2019.
(Continued)

*Primary Examiner* — Tize Ma
(74) *Attorney, Agent, or Firm* — Baker Botts L.L.P.

(57) ABSTRACT

According to some embodiments, a method performed by an extended reality (XR) system comprises: identifying a space within an XR spatial mapping to which virtual content can be overlaid; determining an amount of static occlusion associated with the identified space; and transmitting an indication of the amount of static occlusion associated with the identified space to a virtual content supply side platform. According to some embodiments, a method performed by an XR system comprises: triggering a digital content display opportunity associated with a space within an XR spatial mapping to which virtual content can be overlaid; determining an amount of dynamic occlusion associated with the space; and transmitting an indication of the amount of dynamic occlusion associated with the identified space to a digital content display opportunity bidding system.

10 Claims, 9 Drawing Sheets

700

712 – trigger a digital content display opportunity associated with a space within an XR spatial mapping to which virtual content can be overlayed 714 – determine an amount of dynamic occlusion associated with the space 716 – transmit an indication of the amount of dynamic occlusion associated with the space to a digital content display opportunity bidding system

(58) Field of Classification Search
CPC .... G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017

See application file for complete search history.

(56) References Cited

U.S. PATENT DOCUMENTS

| | | | |
|---|---|---|---|
| 10,248,196 B2 | 4/2019 | Sisbot et al. | |
| 10,432,841 B2 | 10/2019 | Wexler et al. | |
| 10,437,882 B2 | 10/2019 | Starner et al. | |
| 2013/0124326 A1 | 5/2013 | Huang et al. | |
| 2017/0091804 A1* | 3/2017 | van Datta | H04N 21/47815 |
| 2023/0351675 A1* | 11/2023 | McLachlan | G06Q 30/0241 |

OTHER PUBLICATIONS

Iab. Real Time Bidding (RTB) Project, OpenRTB API Specification Version 2.5, Final—Dec. 2016.
Iab. Tech Lab, OpenRTB 3.0 Framework, Launching Secure Supply Chain Standards, Draft for Public Comment—Sep. 2017.
Aaron Luber, Immersive branded experiences in YouTube and display ads, Google Marketing Platform—Jun. 18, 2019.
PCT International Search Report issued for International application No. PCT/IB2019/060196—Sep. 21, 2020.
Christian Baer, Improving UX for Revenue Growth—Oct. 1, 2019.
PCT Written Opinion of the International Searching Authority issued for International application No. PCT/IB2019/060196—Sep. 21, 2020.

* cited by examiner

OCCLUSION OF VIRTUAL CONTENT IN EXTENDED REALITY

PRIORITY

This nonprovisional application is a U.S. National Stage Filing under 35 U.S.C. § 371 of International Patent Application Serial No. PCT/IB2019/060196 filed Nov. 26, 2019 and entitled "Occlusion of Virtual Content in Extended Reality" which is hereby incorporated by reference in its entirety.

TECHNICAL FIELD

Particular embodiments relate to overlay of virtual content in an extended reality (XR) environment, and more specifically to prediction, recognition, and/or treatment of occluded virtual content.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Augmented reality (AR) augments the real world and its physical objects by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height.

Augmented reality and mixed reality are often used to refer the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

Opportunities for displaying digital content may be bought and sold. Digital advertising is bought and sold in standard units, referred to as ad units. There are multiple kinds of ad units, including banner ads, video ads, playable ads, offerwall, etc. Each ad unit may be sold in a specific size, such as 336 by 280 pixels (large rectangle) or 300 by 250 pixels (medium rectangle). Each ad unit may be defined as two-dimensional or three-dimensional. They may also include other sensory features, such as sound, touch, smell or a user's mood. For the digital advertising ecosystem, the Interactive Advertising Bureau (IAB) standardizes ad units.

Prior to its inventory being made available for advertising, custodians of a given physical location spatially map the interior, exterior, or both to identify possible ad units or permutations of ad units. For example, a surface that is 5 meters by 5 meters can be subdivided into multiple ad units of varying dimensions.

Object recognition in extended reality may be used to detect real world objects for triggering the digital content. For example, a consumer may look at a fashion magazine with augmented reality glasses and a video of a catwalk event may play in a video.

Sound, smell and touch are also considered objects subject to object recognition. For example, a diaper advertisement could be displayed as the sound and perhaps the mood of a crying baby is detected. Mood may be deducted from machine learning of sound data.

Advertising content may be bought and sold using real time bidding (RTB). In non-XR environments, RTB is defined as a fully automated process that facilitates buying and selling of advertising inventory. In RTB, inventory may be sold per impression and priced via auction. The auctions determine who wins the right to place an advertisement in the opportunity. The winning bidder's advertisements are then displayed nearly instantaneously.

An advertisement is a piece of creative content designed to influence consumers' perceptions of brands or causes and/or cause them to engage in a set of calls to action.

A supply-side platform (SSP) is a technology publishers use to manage advertisement inventory and receive advertisement revenue. A demand-side platform (DSP) is a system that offers demand management to buyers/advertisers. Advertisers use a DSP to look for and buy inventory from the marketplace. Demand-side platforms may also manage real-time bidding for advertisers. They may send advertisers updates about upcoming auctions.

An advertisement server is a web server that stores digital advertisements. After an RTB auction is won, the advertisement server delivers the advertisement(s) to the user application, XR environment, or website. An impression is an advertisement that has been downloaded from an advertisement server and shown to a user.

A bid request is a request for an advertisement that is triggered when a user opens a website, application, or other digital application that contains advertisement units. Each bid request contains parameters that define the inventory, such as the platform, the time of the impression, and a way to link the inventory to user data, such as an Internet protocol (IP) address, cookies, pixel tags, or ad IDs. The bid request is then transmitted into the real-time bidding ecosystem.

Advertisements may be tailored to particular users. An audience is a list of people who share certain behavioral, psychographical, demographics, and/or other traits. An example is impulsive shoppers with a net worth of $100,000 or above who live in California.

There currently exist certain challenges with XR advertising. For example, current generation mobile network and digital advertising technology is not designed to fully support XR. This slows the adoption of XR technology, for both consumers and advertisers.

Fifth generation (5G) wireless networks address some of the technological barriers to widespread adoption of XR. While earlier generations of mobile networks were generally too slow to process the large volume of data involved in XR, 5G includes faster-than-broadband speeds over the air. 5G's low latency (under 5 milliseconds per 3GPP) enables the processing to happen at the edge or in the cloud. With 5G, later generations of XR glasses will not need to process data locally. Removing local computing may lead to form factors that are indistinguishable from standard glasses. Edge computing may also extend XR devices' battery lifespan, encouraging increased usage.

For advertisers, 5G may enable standardization of XR ad units and enable inventory to be bought and sold via real-time bidding (RTB). Standardizing ad units facilitates the commercialization of XR advertising, as content creators will only need to design content once before it can be distributed. Increasing content creators efficiency will decrease the cost per advertisement, enhance turnaround times, and improve overall return on advertising spend (ROAS).

Not all advertising inventory (i.e., opportunities to display advertisements aggregated by a supply-side provider (SSP)) is of equal value to advertisers. In traditional digital advertising, SSPs score inventory in terms of risk of fraud, bots, low-quality applications and human traffic. XR advertisements are superimposed over real world objects, but traditional measures of advertising inventory quality do not incorporate information about the advertisement's placement within the physical world. Because the physical nature of XR advertisement, unlike mobile advertisement, XR inventory can be occluded (i.e., visually blocked by real objects), drowned out by nearby virtual opportunities; or over- and/or underexposed because of varying lighting conditions.

FIG. 1 is a perspective illustration of an extended reality environment with a partially occluded virtual content display opportunity. Extended reality environment 10 may include spaces 12 within an XR spatial mapping to which virtual content can be overlaid. The illustrated XR scene of a supermarket contains four spaces 12a, 12b, 12c and 12d to which virtual content may be overlaid. For example, spaces 12 may comprise XR ad units. In the illustrated example, space 12d is temporarily blocked by shopper 14. Thus, any virtual content overlaid space 12d may not be completely visible to a shopper in the XR environment.

The occlusion is temporary and will resolve when shopper 14 steps away, illustrating the dynamic nature of occlusion. Current XR advertising platforms do not account for occlusion.

SUMMARY

Based on the description above, certain challenges currently exist with extended reality (XR) advertising and occlusion. When occlusion occurs, dynamic and real-time spatial mapping (processed at the edge or in the cloud) may be used to incorporate occlusion information into an advertising bid request. Real-time mapping may be used to account for the pose and position of the viewer, which may affect measurements of occlusion.

Just as traditional digital advertising allows for scoring of advertisement inventory held by advertising exchanges, particular embodiments described herein enable advertisers to measure the quality of XR advertisement. Improvements in spatial mapping and XR technology facilitate scoring the quality of an XR ad unit. Owners or custodians of physical locations where XR advertising is desired may spatially map their facilities and identify surfaces or spaces that qualify for digital advertisement. In particular embodiments, as the ad units are created, they are scored based on their propensity for occlusion. This may include incorporation of contextual information into the spatial mapping process. Because quality is a dynamic process, some embodiments assign a quality value to every XR bid request. Quality assessments made in real time enable XR ads to be accurately priced via advertising real time bidding (RTB).

In general, particular embodiments detect, measure and address occlusion by real or virtual objects in the XR environment. More specifically, particular embodiments score the probability of occlusion in a given XR ad unit at any point in time and include measures of occlusion in a description of the particular ad unit within a supply side platform (SSP). Some embodiments may include a static estimate of the propensity for occlusion of a given XR ad unit as a feature of the metadata that describes the particular ad unit for filtering. Some embodiments may perform a dynamic measurement of occlusion at the edge or in the cloud, which returns the result to the end user's device so that it can be included within a bid request for pricing.

According to some embodiments, a method performed by an extended reality (XR) system comprises: identifying a space within an XR spatial mapping to which virtual content can be overlaid; determining an amount of static occlusion associated with the identified space; and transmitting an indication of the amount of static occlusion associated with the identified space to a virtual content supply side platform.

In particular embodiments, determining the amount of static occlusion comprising estimating an amount of occlusion based on any one of a location of the space, an angle of illumination of the space, an amount of illumination of the space, static objects in proximity to the space, and available observation points for the space. The indication of the amount of static occlusion may comprise a probability that the space will experience occlusion when observed from a perspective in an XR environment associated with the XR spatial mapping.

In particular embodiments, the identified space comprises an advertising unit and the virtual content supply side platform comprises an advertisement inventory supply side platform. The amount of static occlusion may be determined contemporaneously with creation of the advertising unit.

According to some embodiments, a method performed by an XR system comprises: triggering a digital content display opportunity associated with a space within an XR spatial mapping to which virtual content can be overlaid; determining an amount of dynamic occlusion associated with the space; and transmitting an indication of the amount of dynamic occlusion associated with the identified space to a digital content display opportunity bidding system.

In particular embodiments, determining the amount of dynamic occlusion comprises determining an amount of occlusion of the space at the time of or after the triggering of the digital content display opportunity. Determining the amount of dynamic occlusion may be based on a viewing position of an XR user device viewing the space at the time of or after the triggering of the digital content display opportunity. Determining the amount of dynamic occlusion may be based on any one of a location of the space, an angle of illumination of the space, an amount of illumination of the space, static objects in proximity to the space, dynamic objects in proximity to the space, and available observation points for the space. The indication of the amount of dynamic occlusion may comprise a ratio of an occluded portion of the space.

In particular embodiments, the space comprises an advertising unit and the digital content display opportunity bidding system comprises an advertisement real time bidding system. The advertising unit may be associated with a pre-existing advertising unit identifier.

In particular embodiments, the XR system comprises an XR user device.

According to some embodiments, a method performed by an XR system comprises: obtaining an indication of an amount of static occlusion associated with a space within an XR spatial mapping to which virtual content can be overlaid; generating a digital content display opportunity identifier that uniquely identifies the space; and transmitting the digital content display opportunity identifier and the indication of the amount of static occlusion to a virtual content supply side platform.

In particular embodiments, obtaining the indication of the amount of static occlusion associated with the space within an XR spatial mapping to which virtual content can be overlaid comprises receiving the indication from an XR user device.

In particular embodiments, obtaining the indication of the amount of static occlusion associated with the space within an XR spatial mapping to which virtual content can be overlaid comprises estimating an amount of occlusion based on any one of a location of the space, an angle of illumination of the space, an amount of illumination of the space, static objects in proximity to the space, and available observation points for the space. The indication of the amount of static occlusion may comprise a probability that the space will experience occlusion when observed from a perspective in an XR environment associated with the XR spatial mapping.

In particular embodiments, the space comprises an advertising unit, the digital content display opportunity identifier comprises and advertising unit identifier, and the virtual content supply side platform comprises an advertisement inventory supply side platform. The amount of static occlusion may be determined contemporaneously with creation of the advertising unit identifier.

According to some embodiments, a method performed by an XR system comprises: obtaining an indication of an amount of dynamic occlusion associated with a space within an XR spatial mapping to which virtual content can be overlaid; and transmitting the indication of the first amount of dynamic occlusion to a digital content display opportunity bidding system.

In particular embodiments, obtaining the indication of the amount of dynamic occlusion associated with the space within the XR spatial mapping to which virtual content can be overlaid comprises receiving the indication from an XR user device.

In particular embodiments, obtaining the indication of the amount of dynamic occlusion associated with the space within the XR spatial mapping to which virtual content can be overlaid comprises determining an amount of occlusion of the space at the time of or after the triggering of the digital content display opportunity. Determining the amount of dynamic occlusion may be based on a viewing position of an XR user device viewing the space at the time of or after the triggering of the digital content display opportunity. Determining the amount of dynamic occlusion may be based on any one of a location of the space, an angle of illumination of the space, an amount of illumination of the space, static objects in proximity to the space, dynamic objects in proximity to the space, and available observation points for the space. Determining the amount of dynamic occlusion may be based on a number of XR users in proximity to the space. The indication of the amount of dynamic occlusion may comprise a ratio of an occluded portion of the space.

In particular embodiments, the space comprises an advertising unit and the digital content display opportunity bidding system comprises an advertisement real time bidding system. The advertising unit may be associated with a pre-existing advertising unit identifier.

In particular embodiments, the XR system comprises a network node.

According to some embodiments, an XR system comprises processing circuitry operable to perform any one of the XR system methods described above.

Also disclosed is a computer program product comprising a non-transitory computer readable medium storing computer readable program code, the computer readable program code operable, when executed by processing circuitry to perform any of the methods performed by the XR system described above.

Certain embodiments may provide one or more of the following technical advantages. For example, particular embodiments use 5G, edge computing, and/or cloud computing to complete the occlusion measurement process sufficiently quickly for a seamless customer experience. Particular embodiments are scalable because it is cloud- and edge-ready. The architecture is flexible because the measurement of occlusion in an ad unit can be done using any type of device. By incorporating semantic information into spatial mapping, particular embodiments enable users to restrict their bids to inventory of a particular quality. By incorporating all three dimensions (height, width, and depth) into the occlusion measurement of an ad unit, particular embodiments include improvements in characterizing physical space.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
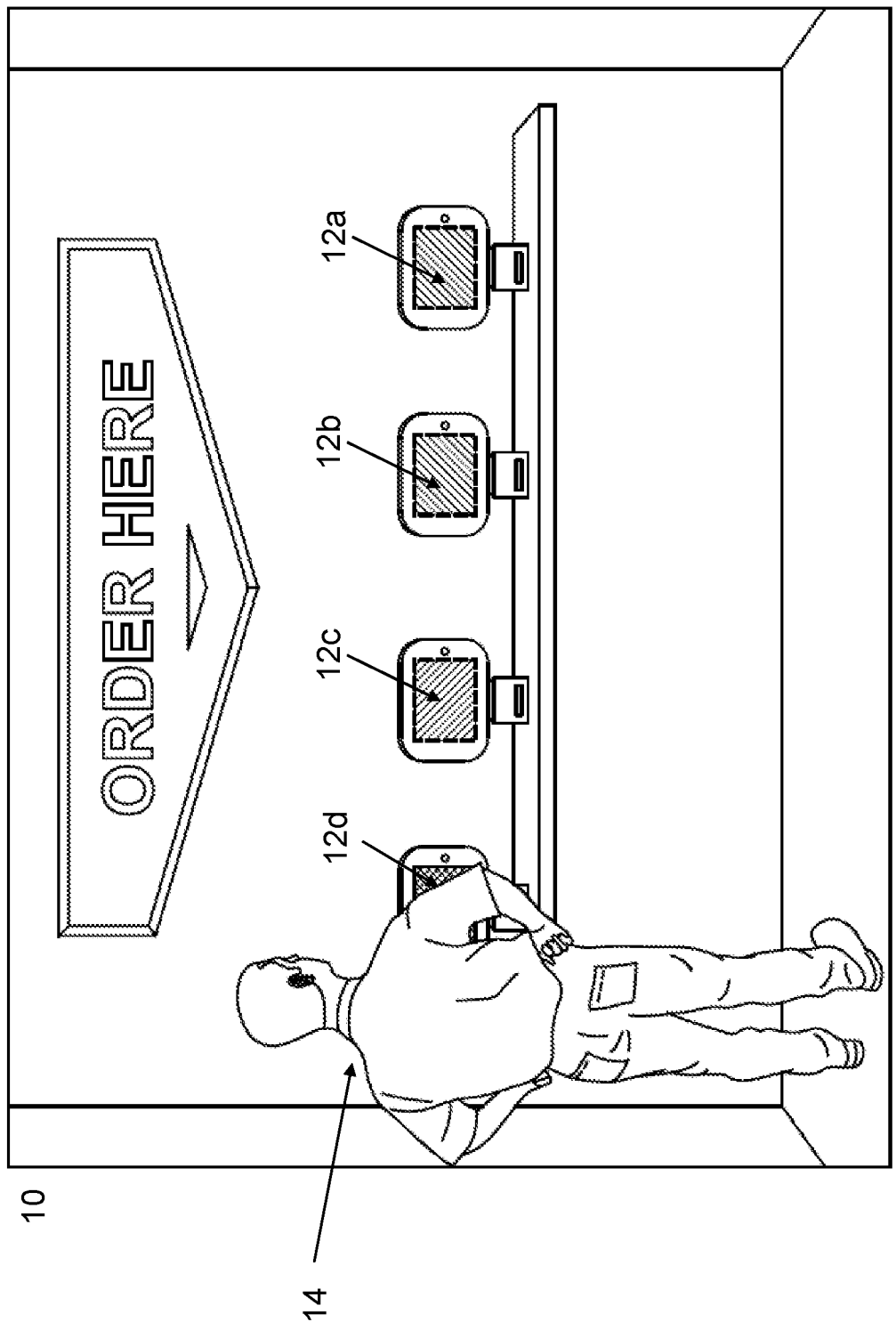
FIG. 1 (above) is a perspective illustration of an example extended reality environment with a partially occluded virtual content display opportunity.

Global digital advertising spend is hundreds of billions of dollars. This figure is predicted to grow rapidly, as advertisers see improved return on advertising spend (ROAS) compared to traditional media channels. Yet, very little of this money is spent on advertising in augmented reality (AR), virtual reality (VR), and extended (XR). The lack of ad unit definition and standardization means that every piece of creative content must be created from scratch. This makes advertising in AR/VR/XR prohibitively expensive for most users, reducing demand for such services.

Even when advertising agencies opt to make custom content, there is no way to measure the quality of advertising inventory within a physical location. This hinders sales of XR inventory via real-time bidding, which increases the price and slows adoption of XR advertising.

As described above, certain challenges currently exist with digital advertising. Certain aspects of the present disclosure and their embodiments may provide solutions to these or other challenges. For example, particular embodiments include scoring the quality of a particular piece of XR advertising inventory in terms of propensity for visual occlusion. Some embodiments estimate the propensity for occlusion in an ad unit during its creation by processing environmental data around the ad unit at the edge or in the cloud and store the information in a supply side platform (SSP). Some embodiments dynamically measure the occlusion in a XR ad unit and include the information in a bid request.

In general, particular embodiments estimate the probability that a given XR ad unit is occluded in either a static or dynamic process. The difference between the two processes is when occlusion is measured and where the data is stored.

In the static process, the probability of occlusion is estimated during the creation of the XR ad unit and stored within the SSP. This gives additional information to bidders about which opportunities they will bid on. In the dynamic process, the amount of occlusion is measured in real time and from the perspective of the observer (e.g., XR device). After processing the image data, at the XR device or at edge/cloud, a percentage of occlusion is included in the bid request.

As an example of static occlusion estimation, when an XR ad unit is created, the static occlusion estimation predicts the probability that the ad unit will experience occlusion as a function of, for example, the location of the unit, the angle of illumination, its exposure, other static objects in the environment, etc. and given multiple observation points (possible XR device poses relative to the ad unit).

In some embodiments, the probability is a sum or average of probabilities for occlusion from different perspectives. Static occlusion may consider non-dynamic objects obstructing the view of the ad unit from a multitude of perspectives. An ad unit that has a clear view from any angle in a room may have low probability of occlusion. An ad unit that is occluded when observed from 25% of the room may have a 25% occlusion probability.

Heterogeneous sensor information, coming from XR devices, Internet-of-Things (IoT) devices and other types of ranging sensors can be aggregated or fused to build the semantic map. Sensors in XR devices may also be of heterogeneous nature. Typically these include monocular cameras and inertial sensors, but may also include stereo cameras, depth sensors (RGB-D), lidar, etc. 5G radios can also be used to aid the estimation of absolute location. After calculating the static occlusion estimate, it may be included within the metadata associated with a particular XR ad unit in a SSP. The static occlusion estimate may be used to filter bids on inventory or for other purposes.

As an example of dynamic occlusion detection, when an XR device displays an ad served programmatically, dynamic occlusion detection refers to the process whereby the environment around the ad unit is scanned in real time. Then given the current pose of the observer (XR device), the amount of occlusion is calculated. The resulting occlusion score may be included in the bid request for that piece of inventory.

Particular embodiments integrate occlusion estimation and detection with programmatic advertising. After the static and/or dynamic occlusion estimation/measurement process has occurred, the resulting probability and/or measurement may be integrated into the programmatic ecosystem.

In static integration, per the Interactive Advertising Board (IAB) and OpenRTB specifications, static inventory quality can be included in later versions of OpenRTB's API specifications enumerated lists specification. OpenRTB's API specifications do not currently support XR objects. In addition to descriptions of an XR object based on the fields included for video objects, such as maximum video length (maxduration), position (pos), skip timing (skipmin), the result of the static occlusion estimation may be included as a standard component of the metadata describing an XR object.

The resulting field may contain a decimal value with a range from 0 to 1. The field represents the probability of occlusion assessed during the static occlusion detection process.

In dynamic integration, the result from the dynamic occlusion detection is included in the bid request for a piece of advertising inventory. After the percentage of occlusion is calculated given the current pose of the observer (XR device), the result may be included in the bid request. Such a field may contain a decimal value with a range from 0 to 1, which represents the percentage of occlusion at that moment in time given the pose of the observer (XR device).

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Semantic mapping may be used for occlusion estimation. For example, particular embodiments combine object detection with spatial mapping such that they benefit and inform each other. Knowing the semantics of a scene can be useful for creating more accurate maps, but also to understand whether dynamic changes on a map are caused by relevant environmental changes or just temporary anomalies. Information about the mapped environment can be beneficial for object detection. For example, changes of orientation or pose of objects can help the detection accuracy.

Moreover, knowing the class of objects in the map can benefit the automatic inclusion or exclusion of such object, space, or surface for ad unit creation. Detected objects, such as faces, animals, cars, traffic signs, etc. could be automatically excluded for ad unit placements.

Semantic knowledge of the environment can be estimated by the joint posterior probability $p(Z_t, X_t | y^t)$ of the state of the XR device within the map $X_t$ and the objects in the map $Z_t = \{z\}_t^N$ given data $y^t = \{y_0, y_1, \ldots, y_t\}$. Such data can be visual-inertial, depth or location measurements. The posterior probability can be factorized as:

$$p(Z_t, X_t | y^t) \propto p(Z_t, X_t | y^t) p(X_t | y^t)$$

For each object $z_t \in Z_t$ in the scene, we need to estimate its pose $g \in SE(3)$ and identify its shape $S \subset \mathbb{R}^3$ simultaneously over time. With the semantic information of identified shapes (objects) particular embodiments may identify the shape label $k \in \{1, 2, \ldots, K\}$ of an object. After k is estimated, its shape $S(k)$ can be read from a database of shapes.

Sematic spatial mapping may provide evidence of objects in the scene $Z_t$ in the form of a likelihood score for their presence, shape k and pose g, as well as accumulated evidence over time and the likelihood at each instant combined into a posterior estimate of an object pose and identity given the current state $X_t$ and data $y^t$.

$$p(z_t = \{k, g\}_t | X_t, y^t)$$

The estimated evidence of objects in the scene can be linked to the inventory to estimate the correct ad unit placement for whitelisted or allowed objects based on their shape label and pose and to identify blacklisted objects in the scene to avoid placing ad units.

The semantic map can be used for estimating occlusion. For example, it may be used for estimating surface/volume of an occluded ad unit given the pose of the XR device (defined as translational and rotational group element $g=(t,\theta)$ in the inertial frame). Based on the ad unit occlusion size estimation, an inventory/bidding system may redefine pricing and rendering appropriately.

Particular embodiments include estimating the probability that a given XR ad unit is occluded in a static or dynamic process. In the static process, the probability of occlusion is estimated during the creation of the ad unit. This information is then stored as metadata within a SSP (e.g., stored with or as part of the ad unit) and can be used for filtering of ad units. In the dynamic process, the actual occlusion is measured in real time. This occlusion is then included in the bid request, enabling bidders to change their price depending upon quality.

Static filtering occurs when bid requests fall outside a SSP's acceptable parameters. For example, SSPs may blacklist inventory on adult websites or applications aimed at children. In particular embodiments, static filtering may refer to SSPs setting a threshold for the maximum/minimum probability of occlusion they will accept before including a given XR ad unit in their inventory. On the buy side, static filtering may refer to buyers setting a threshold for the maximum/minimum probability of occlusion they will accept before bidding on a given bid request.

Static filtering means SSPs and buyers impose (at least) one rule about inventory that does not change. Dynamic filtering, by contrast, allows for buyers and sellers to impose conditional rules for their inventory and bidding behavior.

Static filtration prevents various pieces of inventory from being included in SSPs or prevents bids on bid requests that fall outside of a buyer's static rules. This can leave inventory unsold or unlisted.

Dynamic filtration allows bidders to adjust prices in real time. For example, the probability of occlusion for a given XR ad unit may be estimated at 5% during the static occlusion measurement process. Assuming this satisfies a SSP's static filtration rules, dynamic filtering allows bidders to incorporate the dynamic occlusion measurement and decide whether to bid on that inventory and/or to adjust the price it is willing to pay.

Examples of dynamic bidding processes include header and waterfall bidding. Static and/or dynamic measurements of occlusion can also be used to classify a given XR ad unit as premium, mid-tier, remnant, etc.

An example bid request may include an OpenRTB bid request. Per OpenRTB 2.0, a bid request is sent to bidders whenever an advertising call is sent. It contains all the necessary information for a bidder to set a bid price. In the examples below include a bid request for Microsoft's Magic Leap with and without measures of occlusion.

Example XR Bid Request without Occlusion

```
{
    "id": "1234534625254",
    "at": 2,
    "tmax": 120,
    "imp": [
        {
            "id": "1",
            "banner": {
                "w": 320,
                "h": 50,
                "pos": 1,
                "battr": [
                    13
                ]
            }
        }
    ],
    "badv": [
        "company1.com",
        "company2.com"
    ],
    "app": {
        "id": "234563",
        "bundle": "com.microsoft.magicleap",
        "cat": [
            "IAB2-1",
            "IAB2-2"
        ],
        "publisher": {
            "id": "pub12345"
        }
    },
    "device": {
        "ip": "64.124.253.1",
        "ua": "Mozilla/5.0 (Macintosh; U; Intel Mac OS X 10.6; en-US; rv:1.9.2.16) Gecko/20110319 Firefox/3.6.16",
        "os": "Windows 10"
    },
    "user": {
        "id": "45asdf987656789adfad4678rew656789"
    },
    "ext": {
        "udi": {
            "idfa": "44E9AF56-9ED1-47AE-A3F4-719D050641F9"
        },
```

```
        "appnexus": {
            "seller_member_id": 2066
        }
    }
}
```

Example XR Bid Request with Occlusion

This example bid request is identical to the previous example, except it contains the "occ" field in the device object. In the below example, "occ" is reported at 50, meaning there is 50% occlusion as measured by the dynamic spatial mapping.

```
{
    "id": "1234534625254",
    "at": 2,
    "tmax": 120,
    "imp": [
        {
            "id": "1",
            "banner": {
                "w": 320,
                "h": 50,
                "pos": 1,
                "battr": [
                    13
                ]
            }
        }
    ],
    "badv": [
        "company1.com",
        "company2.com"
    ],
    "app": {
        "id": "234563",
        "bundle": "com.microsoft.magicleap",
        "cat": [
            "IAB2-1",
            "IAB2-2"
        ],
        "publisher":
            "id": "pub12345"
        }
    },
    "device": {
        "ip": "64.124.253.1",
        "ua": "Mozilla/5.0 (Macintosh; U; Intel Mac OS X 10.6;
en-US; rv:1.9.2.16) Gecko/20110319 Firefox/3.6.16",
        "os": "Windows 10"
        "occ":"50"
    },
    "user": {
        "id": "45asdf987656789adfad4678rew656789"
    },
    "ext": {
        "udi": {
            "idfa": "44E9AF56-9ED1-47AE-A3F4-719D050641F9"
        },
        "appnexus": {
            "seller_member_id": 2066
        }
    }
}
```

Although the examples above describe occlusion of XR overlay content, particular embodiments may be used to measure occlusion for a non-XR advertisement, such as display or banner.

An XR system may include one more XR end user devices and one or more network nodes, such as edge or cloud devices. Some example XR system components are described below.

Figure 2:
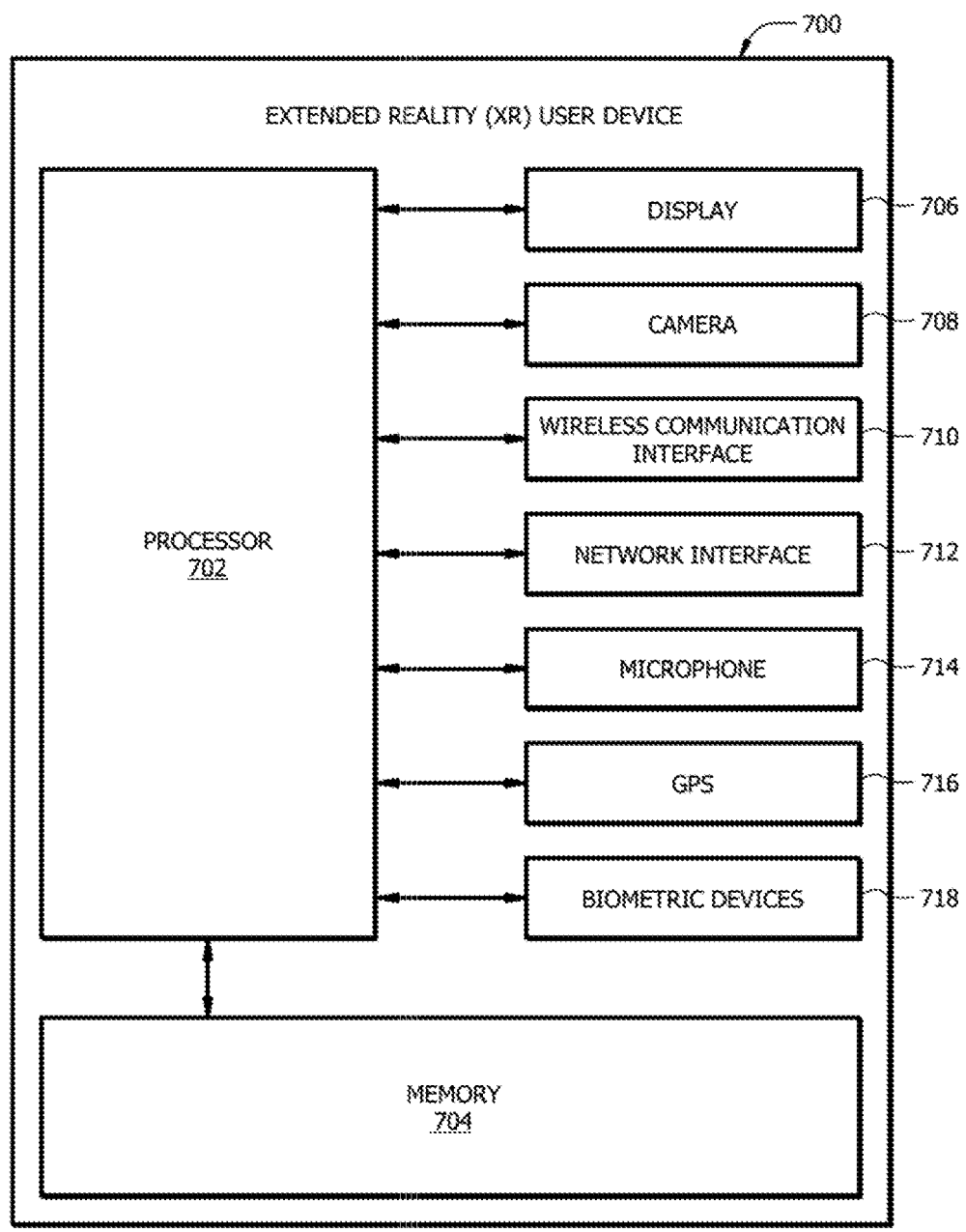
FIG. 2 is a block diagram illustrating an example extended reality (XR) end user device.

FIG. 2 is a block diagram illustrating an example extended reality (XR) end user device. XR user device 700 may be configured to detect virtual content display opportunities, estimate and/or detect occlusion of virtual content display opportunities, and/or overlay virtual content, such as advertisements, according to any of the examples and embodiments described above. Examples of XR end user device 700 in operation are described with respect to FIGS. 1 and 5-8.

XR end user device 700 comprises a one or more processors 702, a memory 704, and a display 706. Particular embodiments may include a camera 708, a wireless communication interface 710, a network interface 712, a microphone 714, a global position system (GPS) sensor 716, and/or one or more biometric devices 718. XR end user device 700 may be configured as shown or in any other suitable configuration. For example, XR end user device 700 may comprise one or more additional components and/or one or more shown components may be omitted.

Processor 702 comprises one or more CPU chips, logic units, cores (e.g., a multi-core processor), FPGAs, ASICs, or DSPs. Processor 702 is communicatively coupled to and in signal communication with memory 704, display 706, camera 708, wireless communication interface 710, network interface 712, microphone 714, GPS sensor 716, and biometric devices 718. Processor 302 is configured to receive and transmit electrical signals among one or more of memory 704, display 706, camera 708, wireless communication interface 710, network interface 712, microphone 714, GPS sensor 716, and biometric devices 718. The electrical signals are used to send and receive data (e.g., images captured from camera 708, virtual objects to display on display 706, etc.) and/or to control or communicate with other devices. For example, processor 702 transmits electrical signals to operate camera 708. Processor 702 may be operably coupled to one or more other devices (not shown).

Processor 702 is configured to process data and may be implemented in hardware or software. Processor 702 is configured to implement various instructions and logic rules, such as instructions and logic rules 220. For example, processor 702 is configured to display virtual objects on display 706, detect hand gestures, identify virtual objects selected by a detected hand gesture (e.g., identify virtual content display opportunities), and capture biometric information of a user via one or more of camera 708, microphone 714, and/or biometric devices 718. In an embodiment, the functions of processor 702 may be implemented using logic units, FPGAs, ASICs, DSPs, or any other suitable hardware.

Memory 704 comprises one or more disks, tape drives, or solid-state drives, and may be used as an over-flow data storage device, to store programs when such programs are selected for execution, and to store instructions and data that are read during program execution, such as instructions and logic rules 220. Memory 704 may be volatile or non-volatile and may comprise ROM, RAM, TCAM, DRAM, and SRAM. Memory 704 is operable to store, for example, instructions for performing the functions of XR end user device 700 described herein, and any other data or instructions.

Display 706 is configured to present visual information to a user in an augmented reality environment that overlays virtual or graphical objects onto tangible objects in a real scene in real-time. In an embodiment, display 706 is a wearable optical display configured to reflect projected images and enables a user to see through the display. For example, display 706 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 706 is a graphical display on a user device. For example, the graphical display may be the display of a tablet or smart phone configured to display an augmented reality environment with virtual or graphical objects overlaid onto tangible objects in a real scene in real-time.

Examples of camera 708 include, but are not limited to, charge-coupled device (CCD) cameras and complementary metal-oxide semiconductor (CMOS) cameras. Camera 708 is configured to capture images of a wearer of XR end user device 700, such as user 102. Camera 708 may be configured to capture images continuously, at predetermined intervals, or on-demand. For example, camera 708 may be configured to receive a command from user 102 to capture an image. In another example, camera 708 is configured to continuously capture images to form a video stream. Camera 708 is communicably coupled to processor 702.

Examples of wireless communication interface 710 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. Wireless communication interface 710 is configured to facilitate processor 702 to communicating with other devices. For example, wireless communication interface 710 is configured to enable processor 702 to send and receive signals with other devices. Wireless communication interface 710 is configured to employ any suitable communication protocol. In some embodiments, wireless communication device 710 may comprise wireless device 110 described with respect to FIG. 3.

Network interface 712 is configured to enable wired and/or wireless communications and to communicate data through a network, system, and/or domain. For example, network interface 712 is configured for communication with a modem, a switch, a router, a bridge, a server, or a client. Processor 702 is configured to receive data using network interface 712 from a network or a remote source, such as cloud storage device 110, institution 122, mobile device 112, etc.

Microphone 714 is configured to capture audio signals (e.g. voice signals or commands) from a user, such as user 102. Microphone 714 is configured to capture audio signals continuously, at predetermined intervals, or on-demand. Microphone 714 is communicably coupled to processor 702.

GPS sensor 716 is configured to capture and to provide geographical location information. For example, GPS sensor 716 is configured to provide a geographic location of a user, such as user 102, employing XR end user device 700. GPS sensor 716 may be configured to provide the geographic location information as a relative geographic location or an absolute geographic location. GPS sensor 716 may provide the geographic location information using geographic coordinates (i.e., longitude and latitude) or any other suitable coordinate system. GPS sensor 716 is communicably coupled to processor 702.

Examples of biometric devices 718 include, but are not limited to, retina scanners and fingerprint scanners. Biometric devices 718 are configured to capture information about a person's physical characteristics and to output a biometric signal based on captured information. A biometric signal is a signal that is uniquely linked to a person based on their physical characteristics. For example, biometric device 718 may be configured to perform a retinal scan of the user's eye and to generate a biometric signal for the user based on the retinal scan. As another example, a biometric device 718 is configured to perform a fingerprint scan of the user's finger and to generate a biometric signal for the user based on the fingerprint scan. Biometric device 718 is communicably coupled to processor 702.

Figure 3:
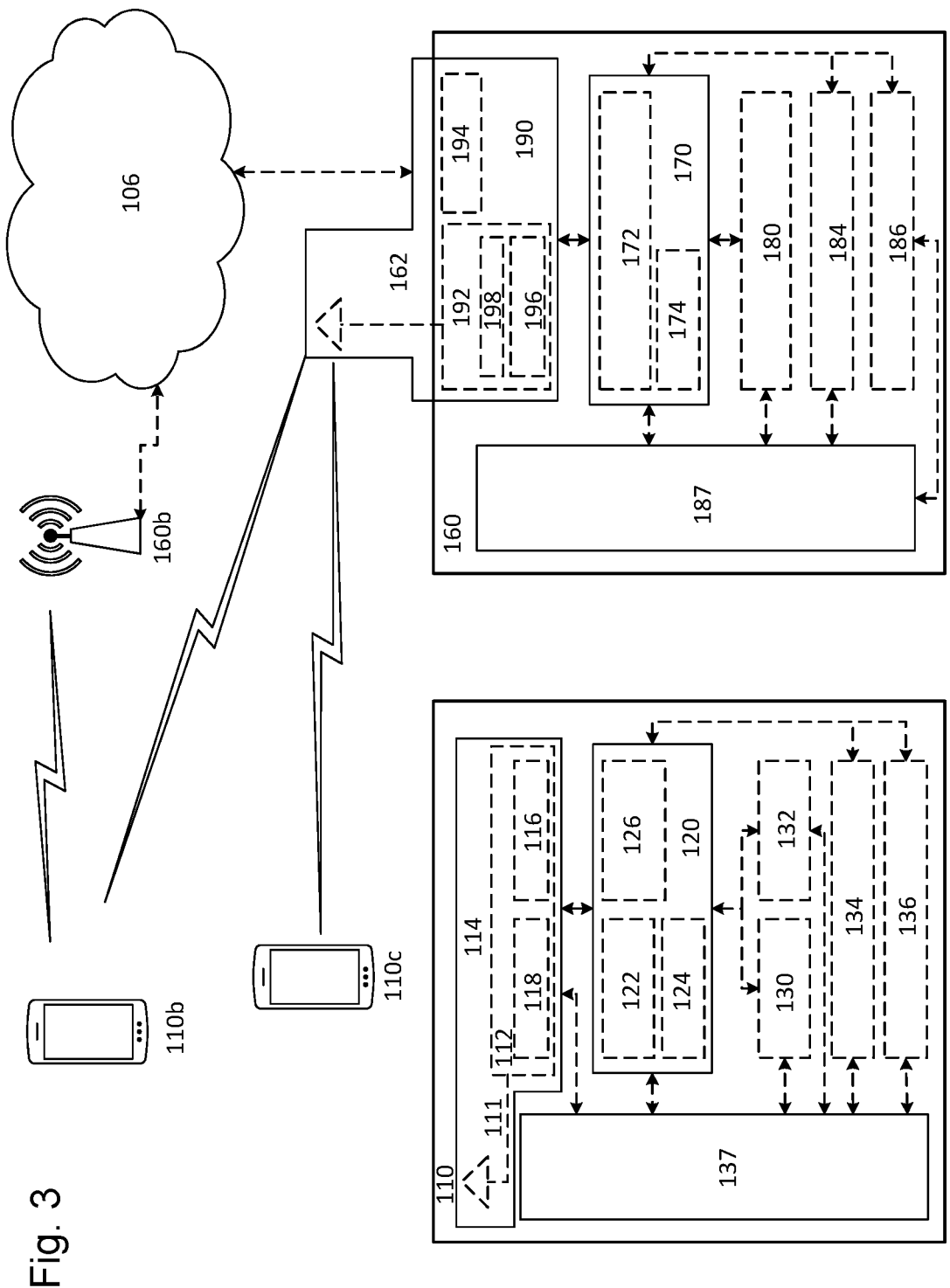
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. Network nodes may also include edge and/or cloud devices.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. A wireless device may also refer to a mobile terminal as part of an IAB node.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 4:
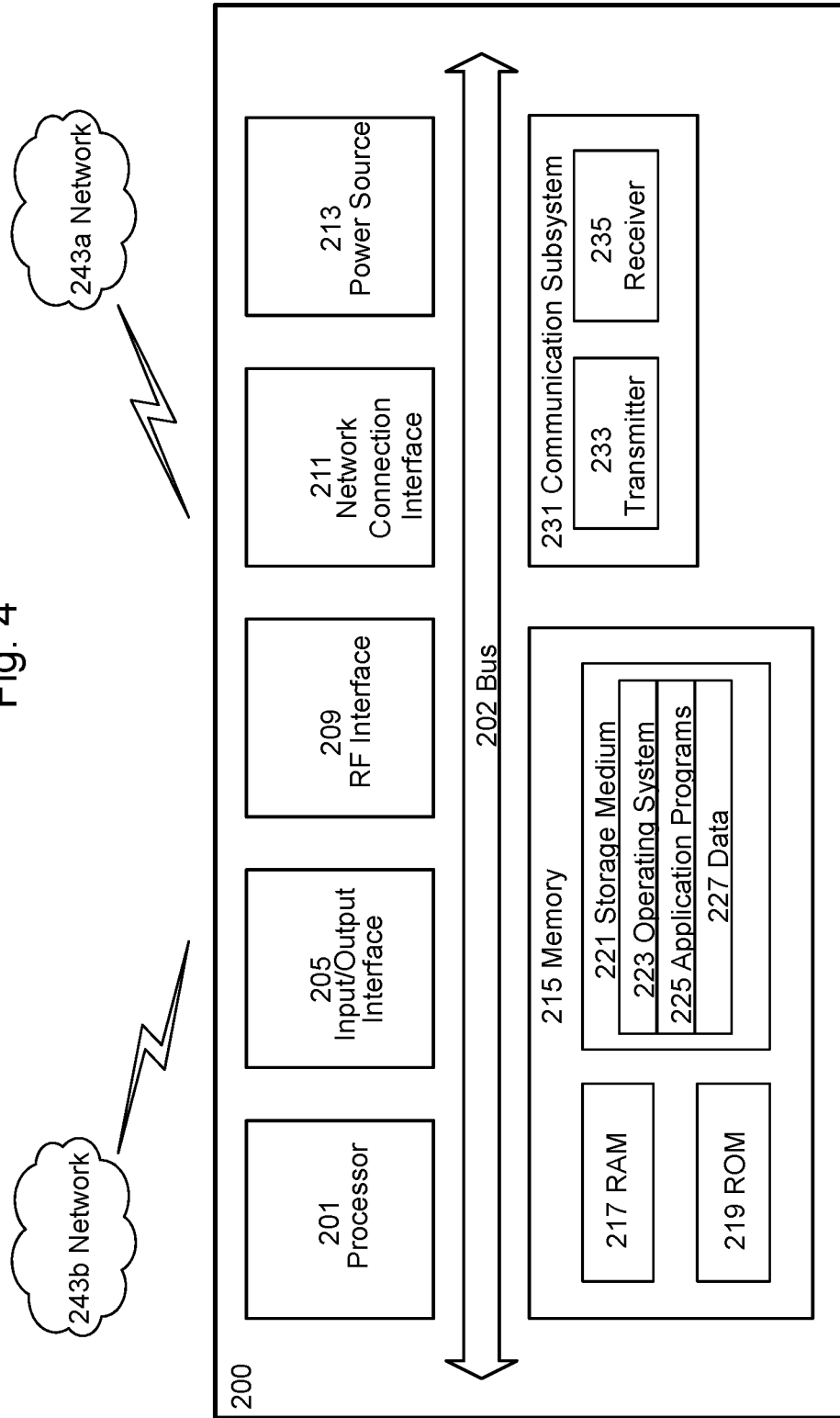
FIG. 4 illustrates an example user equipment, according to certain embodiments.

FIG. 4 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
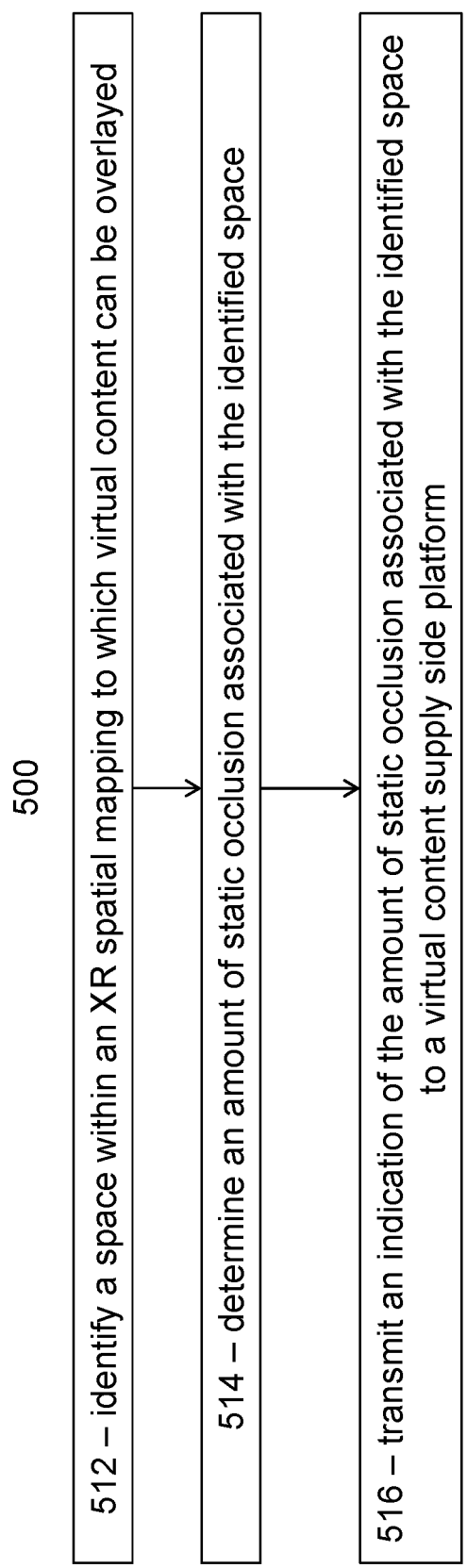
FIGS. 5-8 are flowcharts illustrating example methods in an XR system, according to certain embodiments.

FIG. 5 is a flowchart illustrating an example method in an XR system, according to certain embodiments. In particular embodiments, one or more steps of FIG. 5 may be performed by an XR end user device, such as XR end user device 700 described with respect to FIG. 2.

The method begins at step 512, where the XR system identifies a space within an XR spatial mapping to which virtual content can be overlaid. The XR system may obtain the spatial mapping according to any of the embodiments and examples described above. As one example, an XR end user device may identify an ad unit (or a space or surface that is suitable to become an ad unit) in an XR environment.

At step 514, the XR system determines an amount of static occlusion associated with the identified space. For example, an XR end user device may estimate an amount of occlusion based on any one of a location of the space, an angle of illumination of the space, an amount of illumination of the space, static objects in proximity to the space, and available observation points for the space. Some embodiments may include additional factors. The static occlusion may be determined according to any of the embodiments and examples described above.

The amount of static occlusion may be determined contemporaneously with creation of an advertising unit. For example, upon determining a space or surface is suitable to become and ad unit, the XR end user device may create an ad unit identifier to the space or surface and determine an amount of static occlusion associated with the space. The ad unit identifier and the amount of static occlusion may be stored together.

At step 516, the XR system transmits an indication of the amount of static occlusion associated with the identified space to a virtual content supply side platform. For example, the XR end user device may send an ad unit identifier and an associated indication of occlusion to an advertisement inventory supply side platform. The indication of the amount of static occlusion may comprise a probability that the space will experience occlusion when observed from a perspective in an XR environment associated with the XR spatial mapping.

In some embodiments, the XR end user device may transmit the indication of the amount of static occlusion via a network node, such as an edge and/or cloud node.

Modifications, additions, or omissions may be made to method 500 of FIG. 5. Additionally, one or more steps in the method of FIG. 5 may be performed in parallel or in any suitable order.

Figure 6:
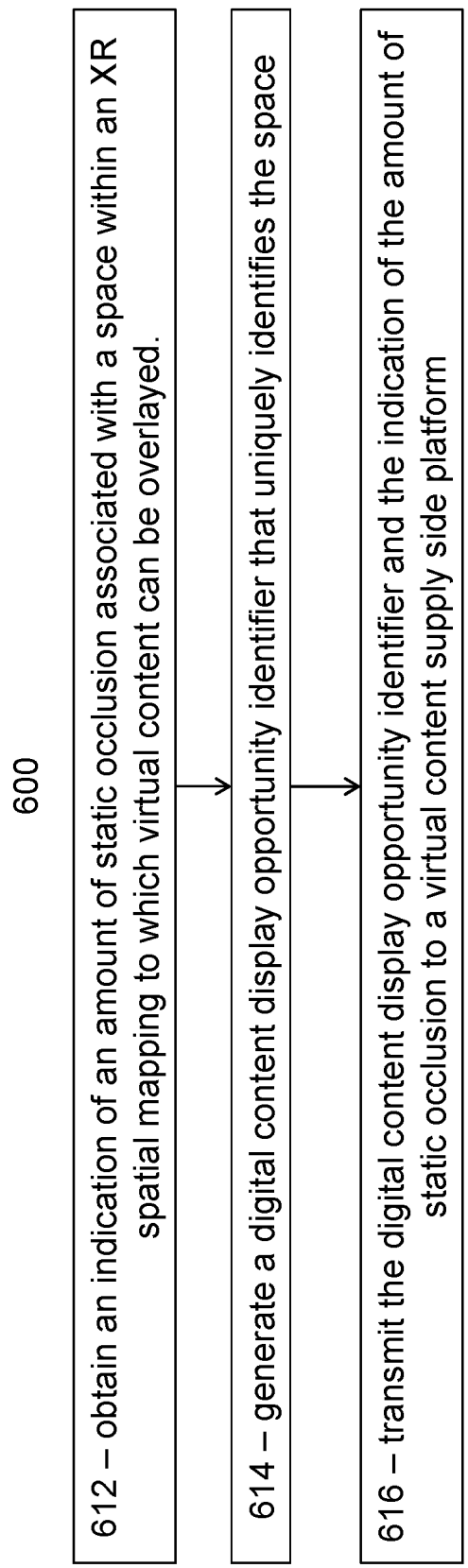

FIG. 6 is a flowchart illustrating another example method in an XR system, according to certain embodiments. In particular embodiments, one or more steps of FIG. 6 may be performed by a network node, such as an edge or cloud node, described with respect to FIG. 3.

The method begins at step 612, where the XR system obtains an indication of an amount of static occlusion associated with a space within an XR spatial mapping to which virtual content can be overlaid. In some embodiments, a network node receives the indication of the amount of static occlusion from an XR end user device. In some embodiments, the network node may use spatial mapping data to estimate an amount of occlusion based on any one of a location of the space, an angle of illumination of the space, an amount of illumination of the space, static objects in proximity to the space, and available observation points for the space. Some embodiments may include additional factors. The static occlusion may be determined according to any of the embodiments and examples described above.

At step 614, the XR system generates a digital content display opportunity identifier that uniquely identifies the space. For example, the network node may generate an ad unit identifier for the space (e.g., create a new standardized ad unit). In some embodiments, the network node may receive an ad unit identifier from an XR end user device. In some embodiments, the network node may assign an ad unit identifier from a range of ad unit identifiers.

At step 616, the XR system transmits the digital content display opportunity identifier and the indication of the amount of static occlusion to a virtual content supply side platform. For example, the network node may transmit an ad unit identifier and an associated indication of an amount of occlusion to an advertisement inventory supply side platform. Users of the advertisement inventory supply side platform may use the indication of the amount of occlusion to filter ad units (e.g., above or below an occlusion threshold). Because the static occlusion does not change over time, the value may be calculated at the time of ad unit creation and stored with the ad unit.

Modifications, additions, or omissions may be made to method 600 of FIG. 6. Additionally, one or more steps in the method of FIG. 6 may be performed in parallel or in any suitable order.

Figure 7:
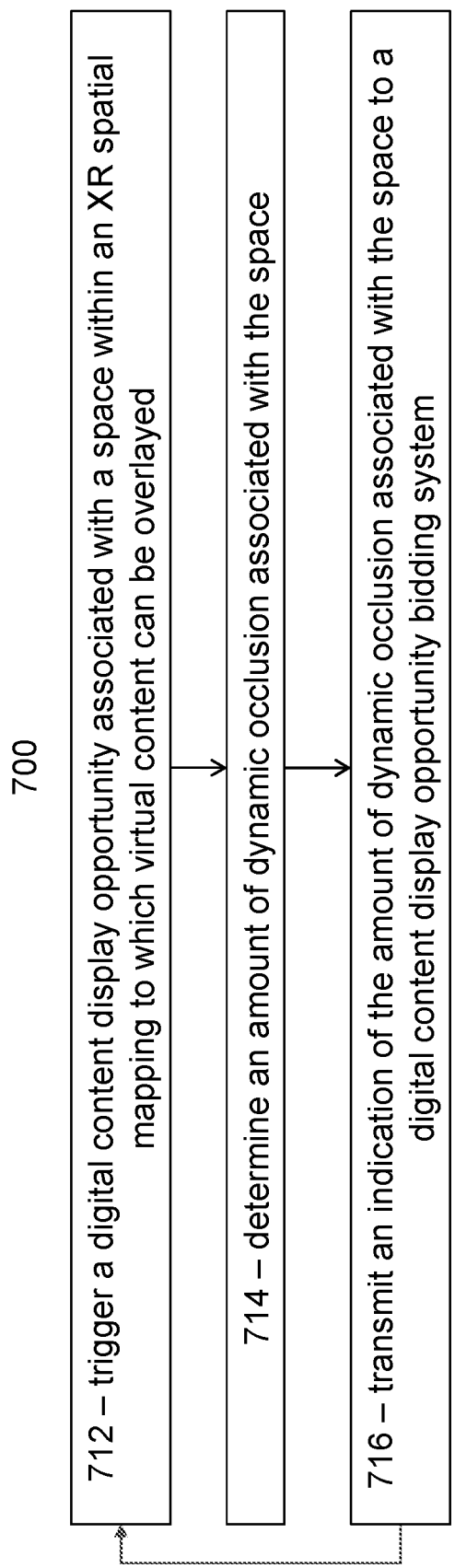

FIG. 7 is a flowchart illustrating another example method in an XR system, according to certain embodiments. In particular embodiments, one or more steps of FIG. 7 may be performed by an XR end user device, such as XR end user device 700 described with respect to FIG. 2.

The method begins at step 712, where the XR system triggers a digital content display opportunity associated with a space within an XR spatial mapping to which virtual content can be overlaid. For example, upon entering a store an XR end user device may trigger a XR advertising opportunity for a pre-existing XR ad unit.

At step 714, the XR system determines an amount of dynamic occlusion associated with the space. Determining the amount of dynamic occlusion may be based on a viewing position of an XR user device viewing the space at the time of or after the triggering of the digital content display opportunity. Determining the amount of dynamic occlusion may be based on any one of a location of the space, an angle of illumination of the space (e.g., change in sun position during the day), an amount of illumination of the space, static objects in proximity to the space, dynamic objects in proximity to the space (e.g., other shoppers), available observation points for the space, and any other suitable parameters. The dynamic occlusion may be determined according to any of the embodiments and examples described above.

For example, at the time an XR end user device triggers an advertising opportunity, the XR end user device may use any of the above factors to determine an amount of occlusion.

At step 716, the XR system transmits an indication of the amount of dynamic occlusion associated with the space to a digital content display opportunity bidding system. For example, the XR end user device may send an ad unit identifier and an associated indication of dynamic occlusion to an advertisement real time bidding system. The indication of the amount of dynamic occlusion may comprise a ratio of an occluded portion of the space. In some embodiments, the XR end user device may transmit the indication of the amount of dynamic occlusion via a network node, such as an edge and/or cloud node.

Modifications, additions, or omissions may be made to method 700 of FIG. 7. Additionally, one or more steps in the method of FIG. 7 may be performed in parallel or in any suitable order. Because the occlusion determination is dynamic, steps 712-716 may be repeated each time an XR end user device triggers an advertising opportunity for the particular ad unit.

Figure 8:
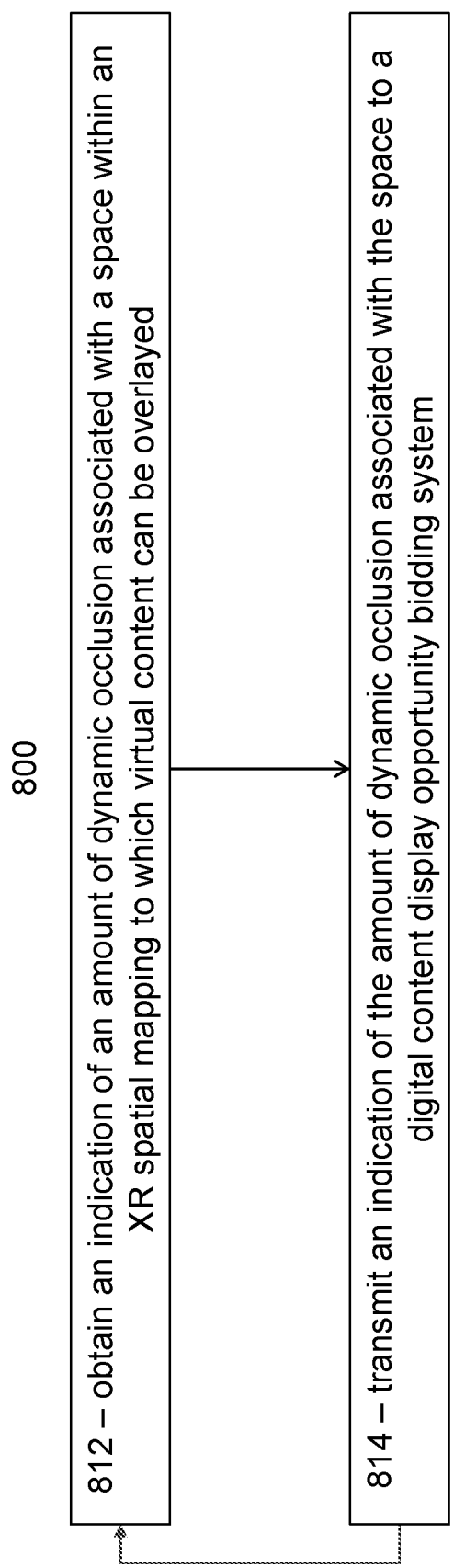

FIG. 8 is a flowchart illustrating another example method in an XR system, according to certain embodiments. In particular embodiments, one or more steps of FIG. 8 may be performed by a network node, such as an edge or cloud node, described with respect to FIG. 3.

The method begins at step 812, where the XR system obtains an indication of an amount of dynamic occlusion associated with a space within an XR spatial mapping to which virtual content can be overlaid. In some embodiments, a network node receives the indication of the amount of dynamic occlusion from an XR end user device.

In some embodiments, the network node may use spatial mapping data to determine an amount of occlusion based on any one of a location of the space, an angle of illumination of the space, an amount of illumination of the space, static objects in proximity to the space, dynamic objects in proximity to the space, and available observation points for the space. Determining the amount of dynamic occlusion may be based on a viewing position of an XR user device viewing the space at the time of or after the triggering of the digital content display opportunity. Determining the amount of dynamic occlusion may be based on a number of XR users in proximity to the space. Some embodiments may include additional factors. The dynamic occlusion may be determined according to any of the embodiments and examples described above.

At step 814, the XR system transmits the indication of the amount of dynamic occlusion to a digital content display opportunity bidding system. For example, the network node may transmit an ad unit identifier and an associated indication of an amount of occlusion to an advertisement real time bidding system. The indication of the amount of dynamic occlusion may comprise a ratio of an occluded portion of the space. Users of the advertisement bidding system may use the indication of the amount of occlusion to adjust bid pricing (e.g., above or below an occlusion threshold). Because the dynamic occlusion may change over time, the value may be calculated at the time an advertising opportunity is triggered.

Modifications, additions, or omissions may be made to method 800 of FIG. 8. Additionally, one or more steps in the method of FIG. 8 may be performed in parallel or in any suitable order. Because the occlusion determination is dynamic, steps 812-814 may be repeated each time an XR end user device triggers an advertising opportunity for the particular ad unit.

Figure 9:
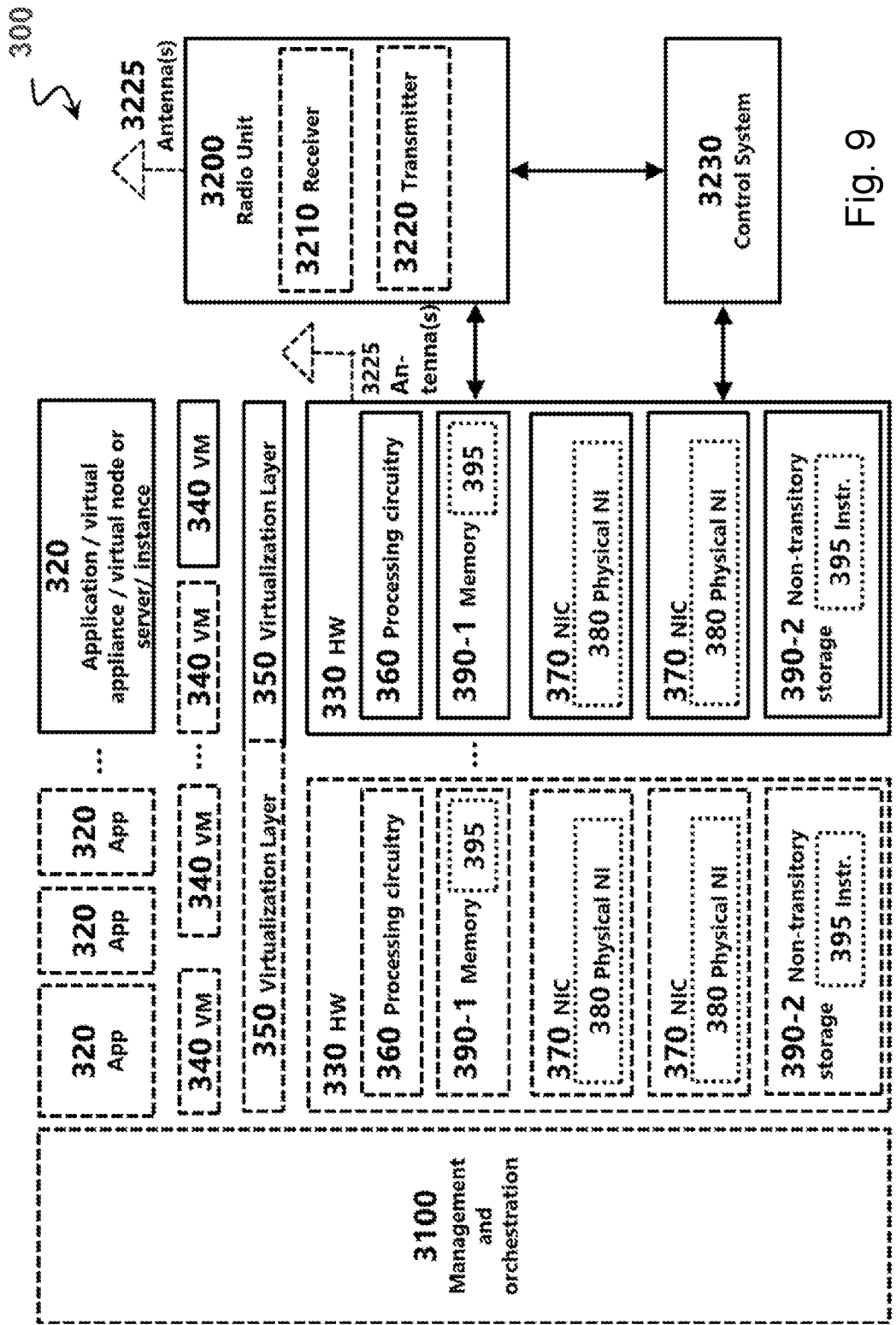
FIG. 9 illustrates an example virtualization environment, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | 3rd Generation Partnership Project |
| 5G | 5th Generation |
| 5GC | 5th Generation Core |
| Ad-ID | A unique identifier for devices capable of showing digital advertising |

| | |
|---|---|
| CDMA | Code Division Multiplexing Access |
| CN | Core Network |
| DSP | Demand Side Platform |
| eNB | E-UTRAN NodeB |
| ePDCCH | enhanced Physical Downlink Control Channel |
| EPS | Evolved Packet System |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| gNB | Base station in NR |
| GNSS | Global Navigation Satellite System |
| GSM | Global System for Mobile communication |
| ID | Identity/Identifier |
| IAB | Interactive Advertising Bureau |
| IoT | Internet-of-Things |
| LTE | Long-Term Evolution |
| MSC | Mobile Switching Center |
| NGC | Next Generation Core |
| NG-RAN | Next Generation RAN |
| NR | New Radio |
| PCell | Primary Cell |
| PDSCH | Physical Downlink Shared Channel |
| PLMN | Public Land Mobile Network |
| RAN | Radio Access Network |
| RAT | Radio Access Technology |
| ROAS | Return on Advertising Spend |
| RNC | Radio Network Controller |
| RTB | Real-Time Bidding |
| SAE | System Architecture Evolution |
| SCell | Secondary Cell |
| SNR | Signal to Noise Ratio |
| SSP | Supply Side Platform |
| TDD | Time Division Duplex |
| TTI | Transmission Time Interval |
| UE | User Equipment |
| UMTS | Universal Mobile Telecommunication System |
| UTRA | Universal Terrestrial Radio Access |
| UTRAN | Universal Terrestrial Radio Access Network |
| WCDMA | Wide CDMA |
| WLAN | Wide Local Area Network |
| XR | Extended Reality |

The invention claimed is:

1. A method performed by an extended reality (XR) system, the method comprising:
triggering a first digital content display opportunity associated with a space within an XR spatial mapping to which virtual content can be overlaid;
determining a first amount of dynamic occlusion associated with the space; and
transmitting an indication of the first amount of dynamic occlusion associated with the space to a digital content display opportunity bidding system.

2. The method of claim 1, further comprising:
triggering a second digital content display opportunity associated with the space within the XR spatial mapping to which virtual content can be overlaid, wherein the second digital content display opportunity is triggered after the first digital content display opportunity;
determining a second amount of dynamic occlusion associated with the space, wherein the second amount of dynamic occlusion is different from the first amount of dynamic occlusion; and
transmitting an indication of the second amount of dynamic occlusion associated with the space to the digital content display opportunity bidding system.

3. The method of claim 1, wherein determining the amount of dynamic occlusion comprises determining an amount of occlusion of the space at the time of or after the triggering of the digital content display opportunity.

4. The method of claim 1, wherein determining the amount of dynamic occlusion is based on a viewing position of an XR user device viewing the space at the time of or after the triggering of the digital content display opportunity.

5. The method of claim 1, wherein determining the amount of dynamic occlusion is based on any one of a location of the space, an angle of illumination of the space, an amount of illumination of the space, static objects in proximity to the space, dynamic objects in proximity to the space, and available observation points for the space.

6. The method of claim 1, wherein the indication of the amount of dynamic occlusion comprises a ratio of an occluded portion of the space.

7. The method of claim 1, wherein the space comprises an advertising unit and the digital content display opportunity bidding system comprises an advertisement real time bidding system.

8. The method of claim 7, wherein the advertising unit is associated with a pre-existing advertising unit identifier.

9. The method of claim 1 wherein the XR system comprises an XR user device.

10. A method performed by an extended reality (XR) system, the method comprising:
obtaining an indication of a first amount of dynamic occlusion associated with a space within an XR spatial mapping to which virtual content can be overlaid; and
transmitting the indication of the first amount of dynamic occlusion to a digital content display opportunity bidding system.

* * * * *